(No Model.) 2 Sheets—Sheet 1.
E. STEBINGER.
SCALE INDICATOR.
No. 586,631. Patented July 20, 1897.
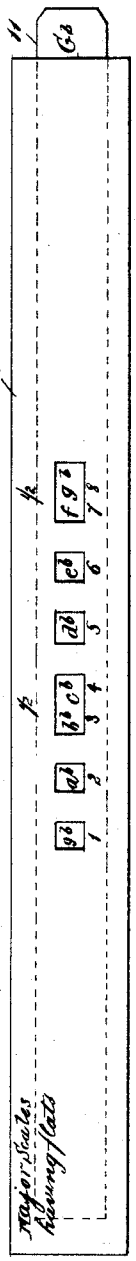
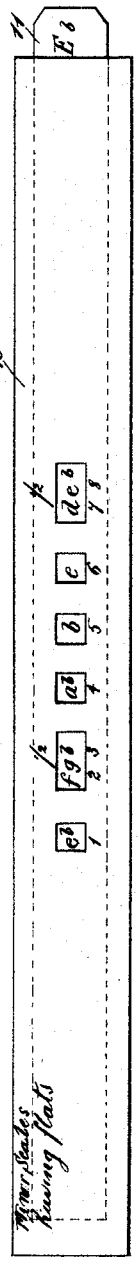
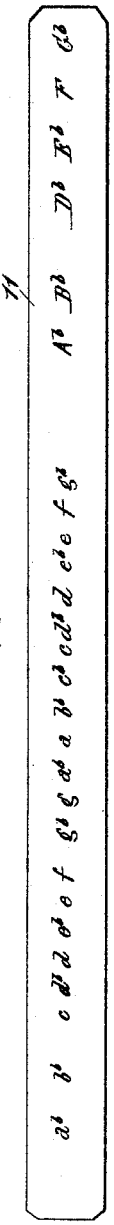
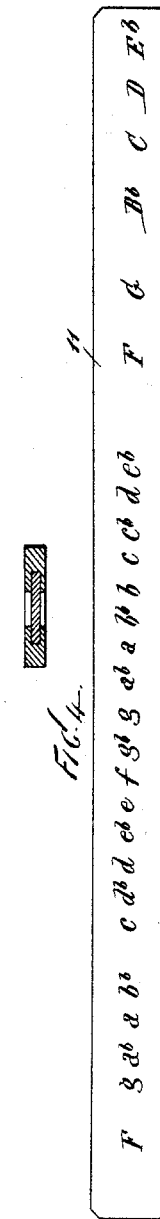
WITNESS:
John Buckler,
C Gerst
INVENTOR
Eugene Stebinger.
BY
Edgar Tate & Co
ATTORNEYS.

(No Model.) 2 Sheets—Sheet 2.
E. STEBINGER.
SCALE INDICATOR.
No. 586,631. Patented July 20, 1897.
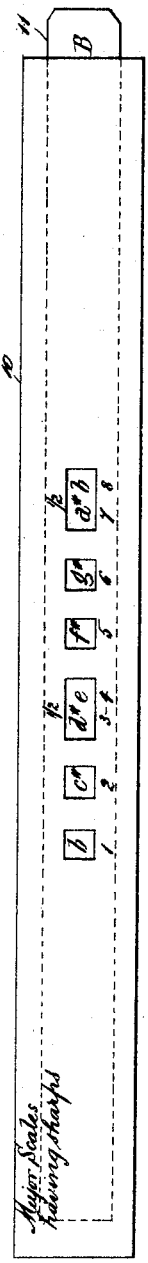
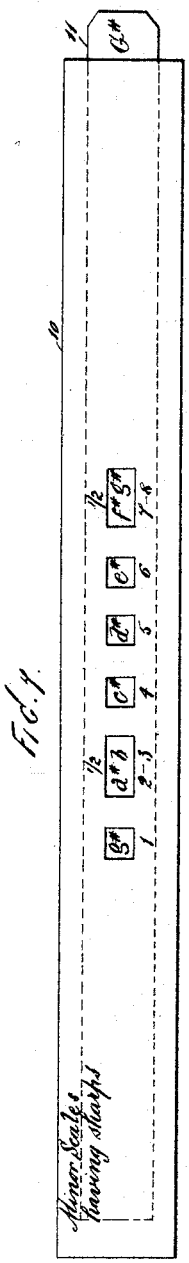
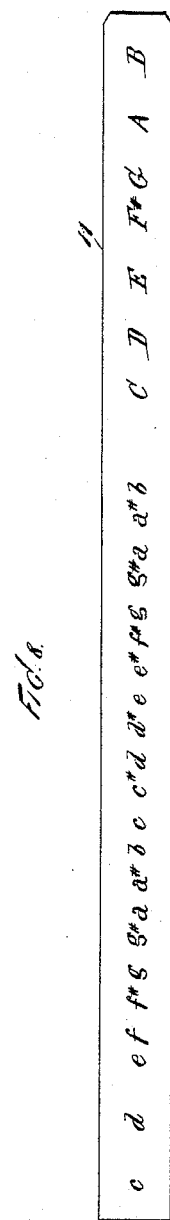
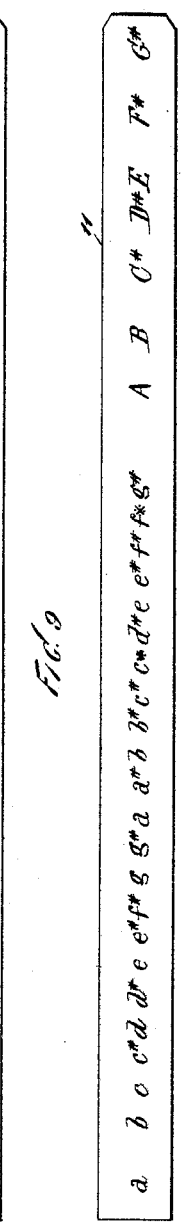
WITNESSES
John Buckler,
C. Gerst
INVENTOR
Eugene Stebinger
BY
Edgar Tate & Co
ATTORNEYS

UNITED STATES PATENT OFFICE.

EUGENE STEBINGER, OF PORTLAND, OREGON.

SCALE-INDICATOR.

SPECIFICATION forming part of Letters Patent No. 586,631, dated July 20, 1897.

Application filed June 15, 1896. Serial No. 595,602. (No model.)

*To all whom it may concern:*

Be it known that I, EUGENE STEBINGER, a citizen of the United States, and a resident of Portland, in the county of Multnomah and State of Oregon, have invented certain new and useful Improvements in Scale-Indicators, of which the following is a specification, reference being had to the accompanying drawings, forming a part thereof, in which similar numerals of reference indicate corresponding parts.

This invention relates to means for teaching music, and particularly for teaching the various scales and making the same visible to the pupil, and the object thereof is to provide a device for this purpose whereby both the major and minor scales may be quickly and easily taught and whereby it is shown that there are only two scales—namely, C major and C minor—while the other twenty-two scales are simply transpositions of these two, the succession of the intervals always remaining the same, while the names of the notes change according to the first note with which the scale is begun.

The invention is fully disclosed in the following specification, of which the accompanying drawings form a part, in which—

Figure 1 is a plan view of one form of the device which I employ, said device being arranged for the purpose of teaching the major and minor scales having flats; Fig. 2, a similar view of the opposite side thereof; Fig. 3, a side or plan view of an adjustable slide which forms a part of the device; Fig. 4, a similar view of the opposite side thereof, this slide being provided on one side with the major scales having flats and on the other with the minor scales having flats; Fig. 5, a transverse section of the device, as shown in Figs. 1 and 2; Fig. 6, a view similar to Fig. 1 of another form of the device which I employ and which is designed for use in teaching the major and minor scales having sharps; Fig. 7, a similar view of the opposite side thereof; and Figs. 8 and 9 are opposite side views of an adjustable slide which constitutes a part of this form of the device, on one side of which is formed the major scales having sharps and on the other the minor scales having sharps.

In Figs. 1 to 5, inclusive, I have shown the form of the device which I employ for indicating the major and the minor scales having flats, and in the practice of my invention I provide for this purpose an oblong casing 10, which may be of any desired length and width and in which is mounted a slide 11, and the casing 10 is provided centrally thereof on each side with six openings, which are arranged in longitudinal line, and on the side which is designed to indicate the major scales having flats the first, second, fourth, and fifth openings are of the same size and preferably square in form and are designed to represent the full tones, while the third and sixth openings are oblong in form and of twice the length of the others and are designed to represent the half-tones, and beneath the first, second, third, and fourth openings, which are the same in form and size, are placed the numerals "1," "2," "5," and "6," respectively, while beneath the third and sixth openings, which are oblong in form, are placed the numerals "3" and "4" and "7" and "8," respectively, and on the side of the casing, at one end thereof, are printed the words "Major scales having flats."

On the opposite side of the casing, as shown in Fig. 2, are printed the words "Minor scales having flats," and on this side the first, third, fourth, and fifth openings are of the same size and preferably square in form and intended to represent the whole tones, while the second and sixth are oblong in form and designed to represent the half-tones, and beneath the first, third, fourth, and fifth openings are placed the numerals "1," "4," "5," and "6," respectively, while beneath the second and sixth openings, which are oblong in form, are placed the numerals "2" and "3" and "7" and "8," respectively.

In Figs. 6 to 9, inclusive, I have shown the device as adapted for use in teaching or indicating major and minor scales having sharps, and in this form of construction one side thereof, as shown in Fig. 6, is provided with the words "Major scales having sharps," and the first, second, fourth, and fifth openings are the same in form and size and designed to indicate whole tones, while the third and sixth openings are oblong in form and designed to represent half-tones, and beneath the first, second, fourth, and fifth openings are placed the numerals "1," "2," "5," and "6," respectively, and beneath the third and sixth openings, which are oblong in form, are placed the numerals "3" and "4" and "7" and "8," respectively.

In Fig. 7 the reverse side of this scale is shown, and printed thereon are the words "Minor scales having sharps," and on this side the first, third, fourth, and fifth openings are the same in form and size and designed to represent the whole tones, while the second and sixth are oblong in form and of twice the length as the others and designed to represent the half-tones, and beneath the first, third, fourth, and fifth openings are placed the numerals "1," "4," "5," and "6," respectively, and beneath the second and sixth openings are placed the numerals "2" and "3" and "7" and "8," respectively.

The slide 11, which is shown in Figs. 3 and 4, has formed on one side the major scales having flats and on the opposite side the minor scales having flats, and the slide 11 (shown in Figs. 8 and 9) has formed on one side the major scales having sharps and on the other the minor scales having sharps.

Every major and minor scale is composed of eight intervals representing five whole tones and two half-tones, and in all major scales the half-tones lie between the third and fourth steps and between the seventh and eighth steps, and for this reason I place over the third and sixth openings on the major scales, which are oblong in form, the fraction "½," and in the minor scales these half-tones are found between the second and third and the seventh and eighth steps, and the fraction "½" is therefore placed over the second and sixth openings on the minor side of the scale, which are oblong in form, and as all other steps or intervals consist of whole tones there is no necessity to mark them.

The slide 11 (shown in Figs. 3 and 4) has formed on its opposite sides, respectively, the names of all the notes of the major scales having flats and the minor scales having flats, and the slide 11 (shown in Figs. 8 and 9) has on its opposite sides, respectively, the names of all the notes in the major scales having sharps and the minor scales having sharps, and the openings in the casings show the successive steps, and as they remain the same in all scales it is only necessary to pull out or push the slides, as the case may require, until you find the letter at the protruding end of the slide which indicates the desired scale, and you have on one side the major scale and on the other its corresponding minor scale. For instance, in Fig. 1 the scale indicates G♭ major and in Fig. 2 E♭ minor, and if the slide be pulled outwardly until the next letter shows the scales indicated will be F major and D minor, &c.

When it is desired to teach a beginner the scales by my improved device, it is only necessary to explain that all scales, major and minor, are composed of eight intervals, representing five whole tones and two half-tones, and that in all major scales the half-tones are always placed between the third and fourth and the seventh and eighth intervals, respectively, and in all minor scales between the second and third and the seventh and eighth intervals, and that there are as many major and minor scales as there are notes within one octave—namely, twelve; but in reality there are only two—namely, C major and C minor—because the other ten are only transpositions of these two, as can be shown by my improved device. In order to establish this fact, it is only necessary to pull out the slide until you come to the letter "C" on the protruding end of the slide and on the side of the major scale when the letters "c," "d," "ef," "g," "a," and "bc" will show through the openings, this being the scale of "C" major, and the half-tone marks will be above the third and fourth and the seventh and eighth steps or intervals, and by turning the indicator over there will appear on the other side the scale A minor, consisting of the steps or intervals "a," "bc," "d," "e," "f♯," and "g♯," "a," and the half-tone marks will be above the second and third and seventh and eighth steps or intervals, thus showing the intervals of C major and A minor.

By moving the slide of that portion of the indicator having sharps to show successively the different letters G, D, A, E, B, and F♯, on the protruding end thereof one can read the scales G, D, A, E, B, and F♯ major, with their relative minor scales on the opposite side of the indicator in the order named, and this will prove that the succession of the intervals is always the same and only the names of the notes are changed.

By taking that portion of the device showing the scales having flats, both major and minor, and moving the slide so as to indicate on its protruding end successively F, B♭, E♭, A♭, D♭, G♭, all the successive major scales having flats may be read together with the corresponding minor scales, which will appear on the opposite side of the indicator, thus proving that the succession of the intervals is always the same no matter what note you begin with and only the names of the notes are changed.

It will be understood that the pupil learns the intervals of each scale by heart before taking up a new one, and to do this my device will be of great help, as it is always handy and easily adjusted.

It will be apparent that only one casing need be employed, but in this event said casing must be provided on its opposite side with all the features of construction and directions hereinbefore described, or it can have but one slide containing all features of the construction of the two slides shown in Figs. 3 and 4 and Figs. 8 and 9, with the only difference that they are made in one piece. In other words, the indicators shown in Figs. 1 and 6 may be formed integrally, as will be readily understood, and this device is simple in construction and operation and well adapted to accomplish the result for which it is intended.

It will be apparent that this device may also be used as an advertising medium, and that any desired form of advertisement may be placed on the sides or surfaces of the indicator where they will not interfere with the other subject-matter thereon.

Having fully described my invention, I claim as new and desire to secure by Letters Patent—

As a new article of manufacture means for teaching music consisting of an oblong casing, of any desired or predetermined length, a slide secured thereon, said casing being provided centrally thereof on each side with six openings arranged in longitudinal lines, and indicating respectively the keys of the major and a minor scale, numerals placed near said openings and characters on the said slides adapted to register with said openings so as to clearly indicate to the user the note or key to be played, all of the said parts being combined in the manner set forth and described.

In testimony that I claim the foregoing as my invention I have signed my name, in presence of the subscribing witnesses, this 2d day of June, 1896.

EUGENE STEBINGER.

Witnesses:
   JAS. RINTOUL, Jr.,
   CHARLES BIRCHER.